(12) United States Patent
Sonnendorfer et al.

(10) Patent No.: US 8,029,005 B2
(45) Date of Patent: Oct. 4, 2011

(54) IMMOBILIZER FOR SHOPPING TROLLEYS (76) Inventors: Horst Sonnendorfer, Puchheim (DE); Franz Wieth, Puchheim (DE)

( * ) Notice: Subject to any disclaimer, the term of this patent is extended or adjusted under 35 U.S.C. 154(b) by 523 days.

(21) Appl. No.: 11/816,660

(22) PCT Filed: Feb. 18, 2006

(86) PCT No.: PCT/DE2006/000306
§ 371 (c)(1),
(2), (4) Date: Aug. 29, 2007

(87) PCT Pub. No.: WO2006/086977
PCT Pub. Date: Aug. 24, 2006

(65) Prior Publication Data
US 2009/0121445 A1    May 14, 2009

(30) Foreign Application Priority Data

| Feb. 18, 2005 | (DE) | 20 2005 002 710 U |
| Feb. 18, 2005 | (DE) | 20 2005 002 711 U |
| Feb. 18, 2005 | (DE) | 20 2005 002 713 U |
| Feb. 18, 2005 | (DE) | 20 2005 002 714 U |
| Sep. 26, 2005 | (DE) | 20 2005 015 212 U |
| Oct. 5, 2005 | (DE) | 20 2005 015 689 U |

(51) Int. Cl.
*B62B 5/04* (2006.01)
(52) U.S. Cl. .................................. 280/33.994
(58) Field of Classification Search ............ 280/33.992, 280/33.994; 188/1.12, 19, 111
See application file for complete search history.

(56) References Cited

U.S. PATENT DOCUMENTS

| 2,964,140 | A | * | 12/1960 | Berezny ................. 188/111 |
| 3,031,037 | A | * | 4/1962 | Stollman ................ 188/111 |
| 3,117,655 | A | * | 1/1964 | Skupas et al. ............ 188/111 |
| 3,495,688 | A | * | 2/1970 | Isaacks ................... 188/31 |
| 4,591,175 | A | * | 5/1986 | Upton et al. ............. 280/33.994 |
| 6,173,817 | B1 | * | 1/2001 | Gray ..................... 188/5 |

FOREIGN PATENT DOCUMENTS

GB    2 384 175    *    7/2003

* cited by examiner

*Primary Examiner* — Frank Vanaman
(74) *Attorney, Agent, or Firm* — Laurence A. Greenberg; Werner H. Stemer; Ralph E. Locher (57) ABSTRACT

A principle for alternately activating and deactivating a blocking device by means of a magnetic field. A further developed embodiment of the invention is provided in that the deactivating magnetic field can be smaller than the activating magnetic field.

12 Claims, 10 Drawing Sheets

Fig. 10

IMMOBILIZER FOR SHOPPING TROLLEYS

TECHNICAL FIELD

The invention relates to a transport trolley with steerable rollers.

Transport trolleys such as these are made available by shopping centers to customers for use within a permissible area.

Immobilizers are used in order to prevent the possibility of a transport trolley also being used outside this area.

PRIOR ART

In known immobilizers, the immobilizer is activated by magnetic forces.

A magnetic zone is located close to the ground at the boundary of the permissible area. On moving over the magnetic zone, magnetic forces operate a primary initiation unit which initiates a mechanical procedure which then in the end activates the immobilizer.

Due to comparatively weak magnetic forces, the primary initiation unit is constructed in a light and fragile manner.

The light and fragile primary initiation unit is, of course, sensitive to vibration. It is therefore disadvantageously possible for vibration which occurs during normal operation of the transport trolley, even within the permissible area, to inadvertently cause operation of the light and fragile primary initiation element, and therefore also to activate the immobilizer.

Utility model application DE 202005002714, which has not yet been published, deals with the problem of making the light and fragile primary initiation unit less sensitive to translational shocks such as those which occur, for example, when the shopping trolley strikes an obstruction (for example a shelf, etc.). The center of gravity of the primary initiation unit described there is chosen such that it is located on the rotation axis, so that simple translational shocks do not produce any torque.

Utility model application DE 202005002713, which has not yet been published, deals with the problem of the light and fragile primary initiation unit admittedly being operated on moving over the magnetic zone, but then returning to its initial position again so quickly that the rest of the mechanical procedure which in the end activates the immobilizer will not yet have been initiated.

The two problems have been solved by separate apparatuses, and therefore lead to increased parts complexity.

It has now also been found that a large number of vibration types which occur during normal operation for example when the shopping trolley is pushed over an uneven surface lead to a type of resonance, which then results in a torque being produced on the light and fragile primary initiation unit.

It has also been found that, when customers return a shopping trolley—which has been located outside the permissible area and whose immobilizer has therefore been activated—back into the permissible area, the shopping trolley is often raised on one side. In consequence, the forces which originate from the magnetic zone act on the immobilizer only to a reduced extent.

DISCLOSURE OF THE INVENTION

Technical Object

One object of the invention is to provide an immobilizer in which the primary initiation unit is designed such that it is insensitive not only to individual shocks but also to a large number of vibration types, and additionally has the characteristic of reliably initiating the rest of the mechanical procedure, which then in the end activates the immobilizer, essentially independently of the time period during which the magnetic forces act on the primary initiation unit when moving over the magnetic zone.

A further object of the invention is for weaker magnetic fields to be used for deactivation than for activation, in order to ensure that the immobilizer is also reliably deactivated again, even if the shopping trolley is raised on one side, on transport trolleys which have been moved back into the permissible area with the immobilizer activated.

In a generalized form, the object can be defined by the primary initiation unit being very largely uninfluenced by shocks and vibration, but by being very sensitive and reacting reliably to magnetically caused forces acting from the outside, and reacting even more sensitively to magnetically caused forces acting from the outside with regard to deactivation of the immobilizer.

Technical Solution

The inventive solution provides for the primary initiation unit to be equipped with opposing inertia elements which make the initiation unit insensitive to shocks and vibration.

In addition, the initiation unit is provided with a response which makes the deliberate activation of the immobilizer independent of the time period during which the magnetic forces act from the outside on moving over the magnetic zone.

The considerations which have led to the creation of the present invention have in this case made use of the fact that the disturbance forces and the initiation forces are based on different physical effects.

The disturbance forces are caused by the interaction with the mass of all of the parts of the initiation unit, while the initiation forces are caused by the interaction of individual parts with magnetic forces.

The disturbance forces now act on all the parts of the initiation unit, while in contrast the magnetic forces act on only one part of the initiation unit.

Further considerations are based on the idea that two bodies, when they are moved towards one another by a temporarily acting force, still remain connected to one another subsequently by virtue of an interlock or force fit, even when the temporarily acting force is no longer present.

This interlock or force fit can be produced by mechanical means, or likewise by magnetic forces.

The considerations relating to the part of the object concerned with the immobilizer reacting for deactivation purposes particularly sensitively to magnetically caused forces acting from the outside made use of the discovery that magnets which are located within the immobilizer can influence the effect of the magnetic forces which act from outside.

In the present case, these considerations have led to a solution as formulated in the claims and dependent claims.

Advantageous Effects

The stochastically occurring disturbance forces eliminate one another and do not lead to any significant movement of the initiation unit, while intentionally produced magnetic forces in contrast act specifically on those parts of the initiation unit which are intended to be moved in order to initiate the immobilizer.

These deliberately moved parts of the initiation unit remain fixed in the desired position for a defined time, to be precise even when the immobilizer is no longer located in the area of influence of the magnetic force.

By way of example, this means that it is possible to move over a magnetic zone at different speeds without this having any influence on the initiation of the immobilizer.

In consequence, the operation of the immobilizer is very largely independent of the time period during which the deliberately produced magnetic forces act.

An appropriate refinement of the mechanical sequence within the immobilizer results in the initiation unit returning back to the initial position again as soon as the immobilizer is activated.

In this initial position, the primary initiation unit is ready to initiate a mechanical sequence within the immobilizer once again by means of a magnetic force which acts from the outside once again, and this then leads to deactivation of the immobilizer.

This refinement of the immobilizer means that an activated immobilizer can be deactivated again by the same magnetic force source which led to activation.

This magnetic force source can optionally originate from the magnetic zone which defines the boundary of the permissible area or from a magnetic tool used by authorized persons (for example a supermarket employee).

This on the one hand results in the advantage that a shopping trolley which is located with an activated immobilizer outside the permissible area can be used freely again by anyone immediately and without any problems, as soon as the shopping trolley is moved back over the magnetic zone into the permissible area.

On the other hand, an authorized person can use a magnetic tool, which operates without making contact, to deactivate the immobilizer at any desired point, in an advantageously convenient manner, thus making it considerably easier to return the shopping trolley.

Since deactivation is carried out by weaker magnetic fields than activation, this advantageously ensures that the immobilizer is reliably deactivated again on the transport trolleys which have been moved back into the permissible area with the immobilizer activated, particularly if the shopping trolley is raised on one side.

DETAILED DESCRIPTION OF THE DRAWINGS

One possible exemplary embodiment of the invention will be explained in more detail in the following text with reference to a plurality of figures.

Figure 1:
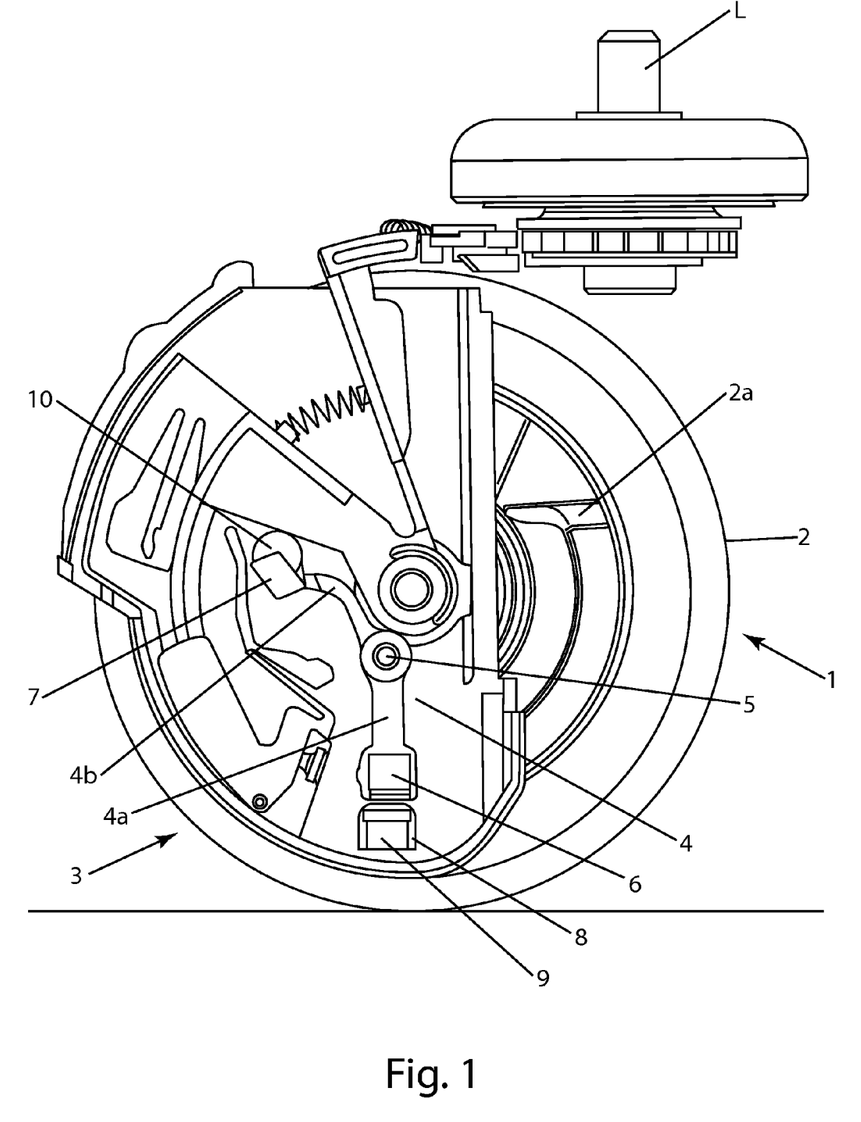
FIG. 1 is a partially sectioned side view of the immobilizer.

FIG. 1 shows a view from the side of the immobilizer 1, illustrated in a partially sectioned form.

The roller 2 of the immobilizer 1 is connected via the steering shaft L to a shopping trolley, which is not shown here, for clarity reasons. The roller 2 has a driver 2a, whose function will be described in detail later.

A primary initiation unit 3 is provided in the interior of the immobilizer, and can be moved under the influence of a magnetic field.

The initiation unit 3 has a lever 4 with two lever arms (4a, 4b), which is designed such that it can rotate about a rotation point 5.

One lever arm 4a is fitted with a weight 6, and the other lever arm 4b has a type of block 7 at the end.

The block 7 on the arm 4b holds a ball 10 in the rest position. The precise function of the ball 10 will be described in more detail in the following text.

A further lever 8 is located behind the lever arm 4a. A permanent magnet 9 is located at the end of the lever 8. The lever 8 is mounted such that it can rotate about a rotation point 5a, which cannot be seen in this illustration, and is connected to the lever arm 4a via a tooth system 12, which likewise cannot be seen.

The tooth system between the lever 8 and the lever arm 4a as well as the masses of the body 6 on the one hand and of the permanent magnet 9 on the other hand have a compensating effect on the influences of rotary accelerations and translational accelerations. The moments of the lever 4 about the rotation point 5 which occur in the event of accelerations are very largely compensated for by the moment of the lever 8 about the shaft 5a. Inadvertent movement of the initiation unit 3 can therefore be prevented.

The weight 6 is composed of a material which is attracted by the permanent magnet 9.

This attraction force of the permanent magnet 9 on the weight 6 has a further effect, damping disturbances, on the initiation unit, since the permanent magnet 9 attracts the weight 6 towards it.

This pulling force reduces the possible influence of metal parts in the area of the roadway. The direct proximity of the weight 6 to the permanent magnet 9 means that the magnetic forces preferably act between these two parts.

Without the presence of the body 6, it would otherwise be possible for the permanent magnet 6 to carry out a movement which would then lead to inadvertent initiation of the immobilizer as a result of the attraction force between it and a metal part located on the roadway. One such metal part is, for example, a manhole cover.

Figure 2:
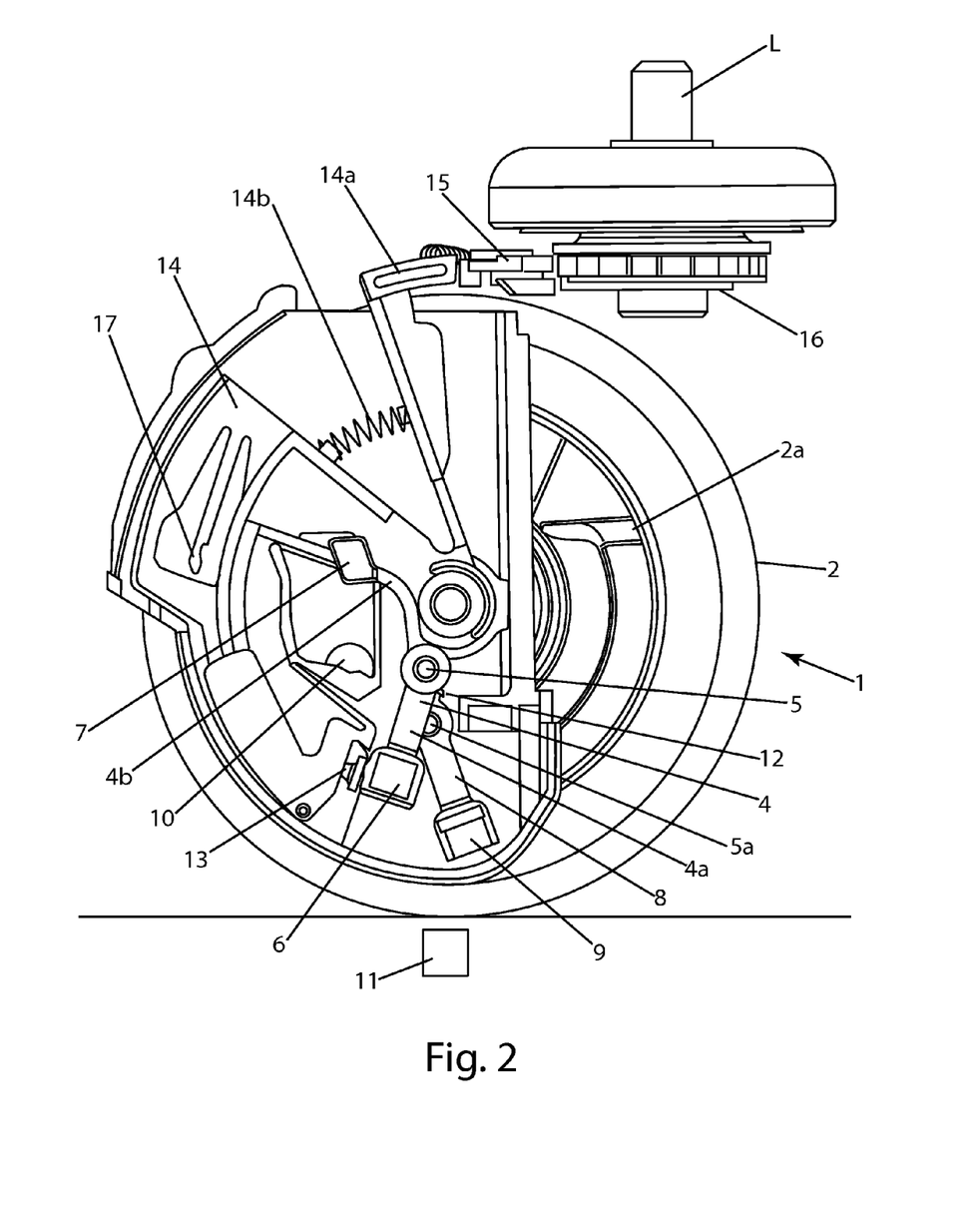
FIG. 2 is a partially sectioned side view of the immobilizer in the initiating position.

FIG. 2 shows the initiation element 4 after having moved over a magnet 11 incorporated in the ground.

The polarity of the magnet 11 is arranged such that a repulsion force occurs between the magnet 11 and the permanent magnet 9. The magnet 11 may be either a permanent magnet or an electromagnet.

The repulsion force between the permanent magnet 9 and the magnet 11 is sufficiently strong that the attractive force described above between the body 6 and the magnet 9 is overcome.

These repulsion forces between the permanent magnet 9 and the magnet 11 result in the lever 8 being rotated somewhat counterclockwise about the rotation point 5a.

This rotation of the lever 8 results, via the tooth system 12, in opposite rotation of the lever 4 (with the lever arms 4a and 4b) about the shaft 5, with the consequence that the block 7 is pivoted away, and the ball 10 is released.

The rotation of the lever 4 results in the lever arm 4a arriving at a holding element, which fixes the lever arm 4a in the pivoted position and therefore also fixes the entire initiation unit in a defined, initiated position.

The holding element which is fixing the lever arm 4a may be designed in many different ways.

It can be based on friction or an interlock, for example an incline, or a type of hook and loop fastener.

It is also possible to make use of the fact that the weight 6 is composed of a material which is attracted by a magnet, as has already been mentioned above.

In the illustrated example, the holding element is a permanent magnet 13.

Attracted by this permanent magnet 13, the weight 6 and therefore the entire initiation unit as well remain in a defined position.

In consequence, the ball 10 has sufficient time to follow a predetermined path to a position in which the ball 10 can act as a coupling between the wheel 2 and a rocker 14.

As soon as the wheel 2 has rotated sufficiently for the driver 2a to touch the ball 10, the ball 10 then also actually acts as a coupling and moves the rocker 14, in the sense of rotating the wheel, and now pushes a catch 15 against a tooth system 16. The catch 15 is attached, such that it can pivot, to a part of the housing, which is not shown here. A spring 14b ensures that the part 14a is prestressed to a certain extent with respect to the rest of the rocker 14.

The rocker 14 remains fixed in this position by a holding element 17.

This holding element 17 has the characteristic that it releases the rocker 14 again when the rocker 14 has been driven once again by the coupled ball 10 in the rotation direction of the wheel 2.

This function is comparable to the behavior of a ball pen in which the tip returns into the housing again by pushing the pushbutton once again.

The catch 15 and the tooth system 16 are designed such that the steering angle of the wheel about the shaft L can initially be changed in only one direction. As soon as a certain steering angle is reached, this steering angle remains fixed.

If an immobilizer is in each case fitted to the front axle and the rear axle of the shopping trolley, together with a constellation such that the steering angles are inclined with respect to one another in the fixed position, it is no longer possible to move normally in a straight line.

Figure 3:
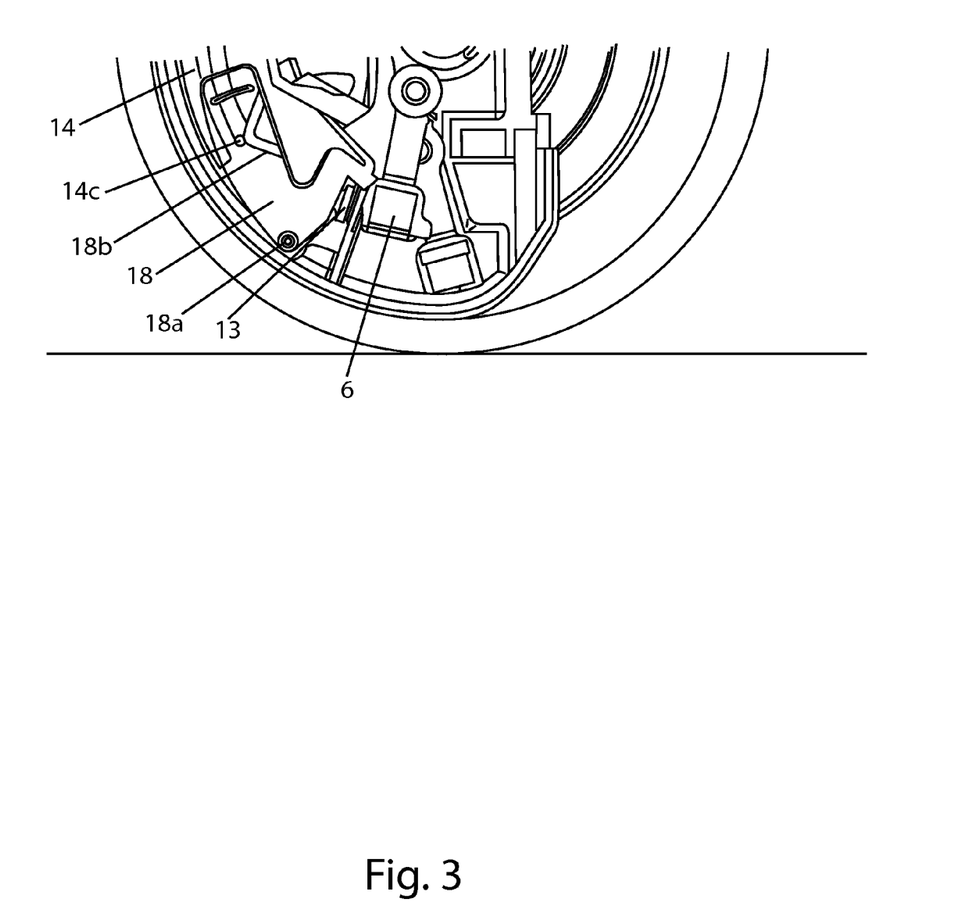
FIG. 3 is another partially sectioned side view of the immobilizer in the initiating position.

FIG. 3 shows a detail relating to the permanent magnet 13.

As described, the weight 6 is held by the permanent magnet 13 in order to give the ball 10 sufficient time to move to the position in which it acts as a coupling between the wheel 2 and the rocker 14.

However, it is also important for the operation of the immobilizer that the initiation unit 3 then moves back to the initial position described in FIG. 1. This is the only way to allow alternate activation and deactivation of the immobilizer.

The weight 6 must be separated from the permanent magnet 13 again in order to allow the initiation unit 3 to return to the initial position again.

A lever 18 is provided for this purpose, which presses against the weight 6, controlled by the movement of the rocker 14, and thus releases it from the permanent magnet 13.

The lever 18 is mounted such that it can rotate about a shaft 18a. The transparent illustration of the lever 18 makes it possible to see a slotted link 18b which is in contact with a driver 14c for the rocker 14.

The movement of the rocker 14 pivots the lever 18 such that it pushes the weight 6 so far away from the permanent magnet 13 that the magnetic force is no longer sufficient to hold the weight 6.

The initiation unit 3 and all of the parts connected to it can now return to the initial position again, in which they were located before moving over the magnet 11 incorporated in the ground (as shown in FIG. 2).

Figure 4:
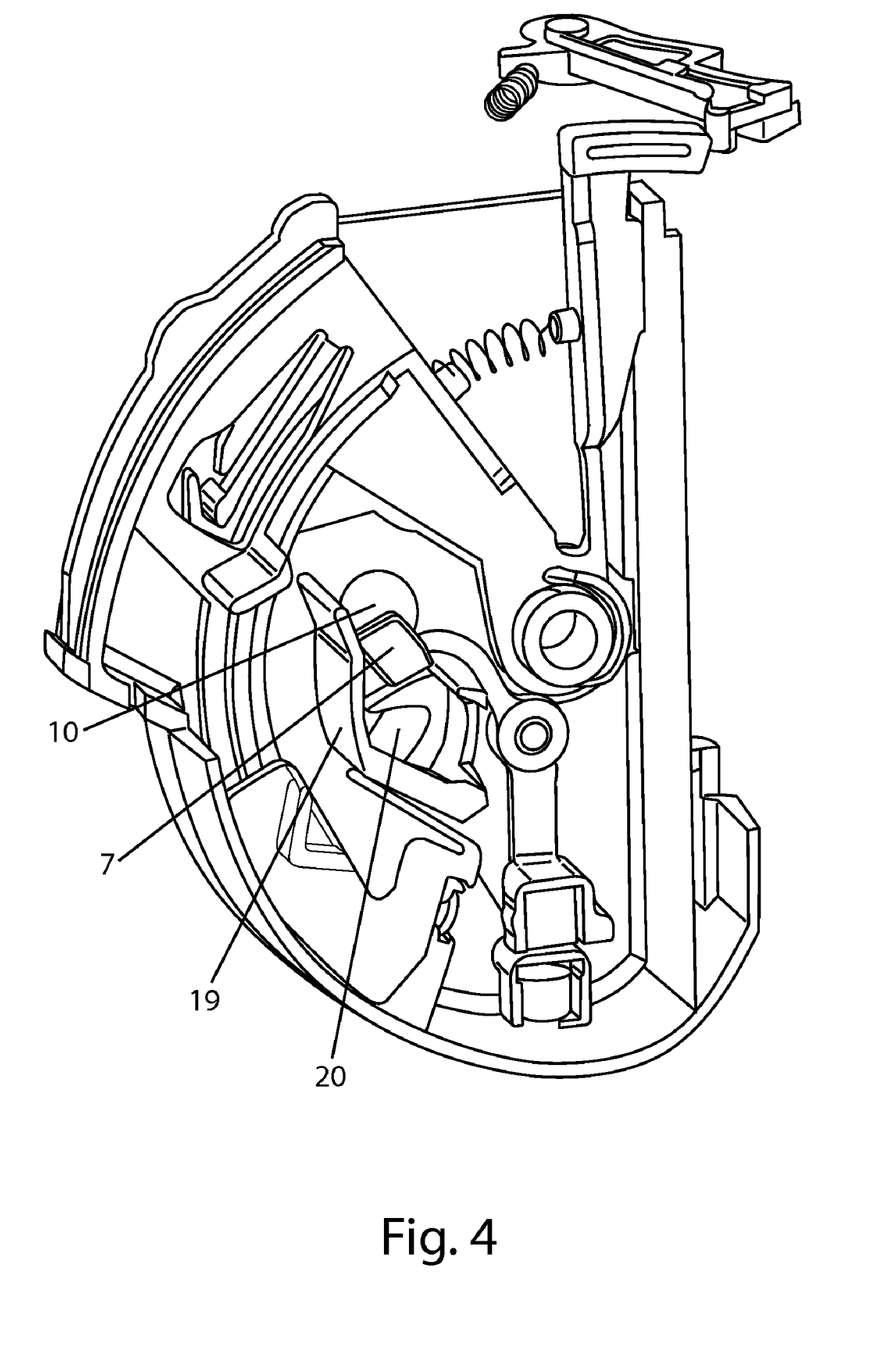
FIG. 4 is a perspective view of the immobilizer.

FIG. 4 shows that the ball 10 can roll along the groove 19 into a channel 20 once the flap 7 has been pivoted away.

Figure 5:
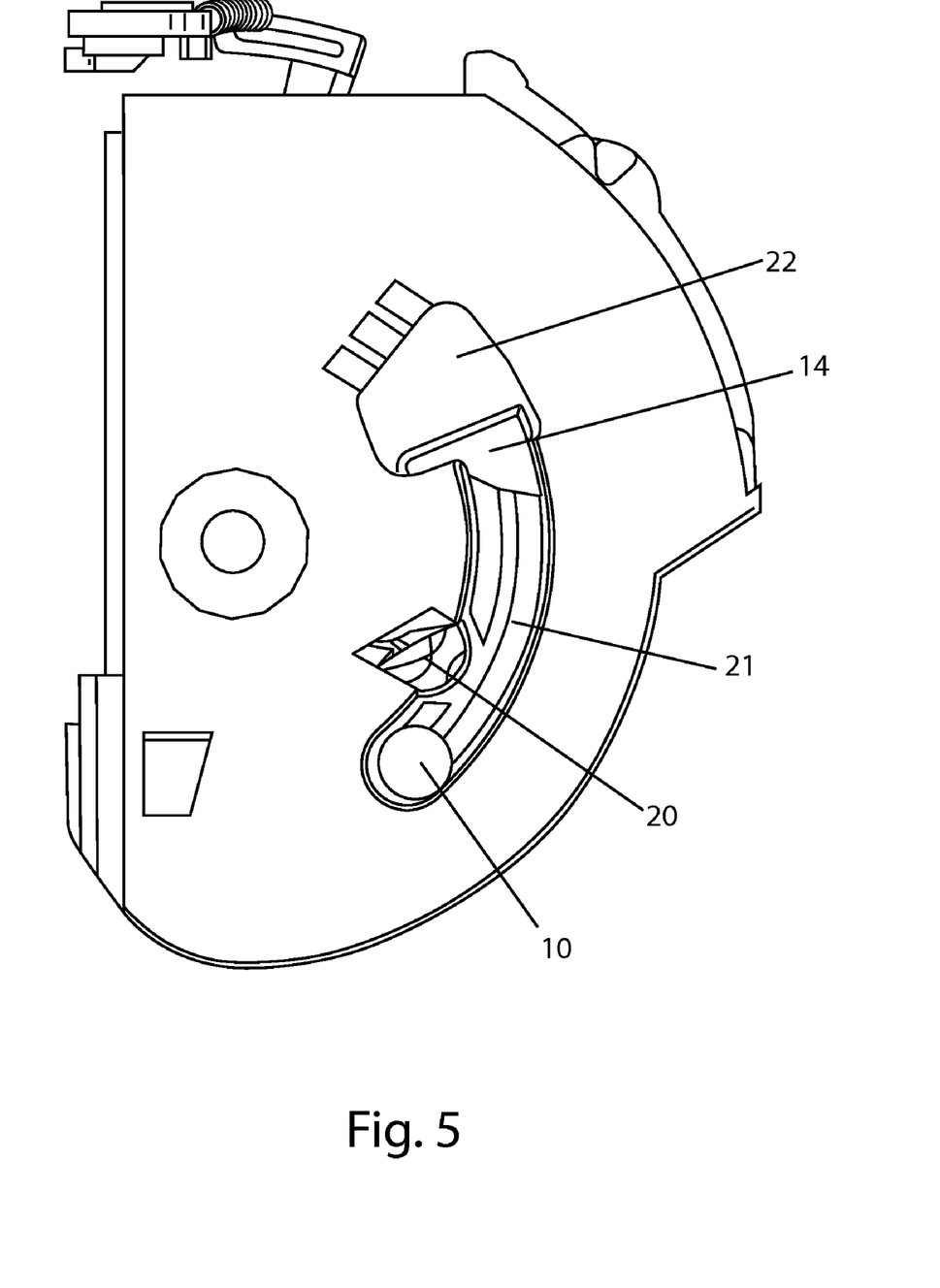
FIG. 5 is another side view showing a ball of the immobilizer.

FIG. 5 shows the situation after the ball 10 has rolled through the channel 20. The ball is now located in a position in which it can act as a coupling between the driver 2a on the roller 2 and the rocker 14.

Figure 6:
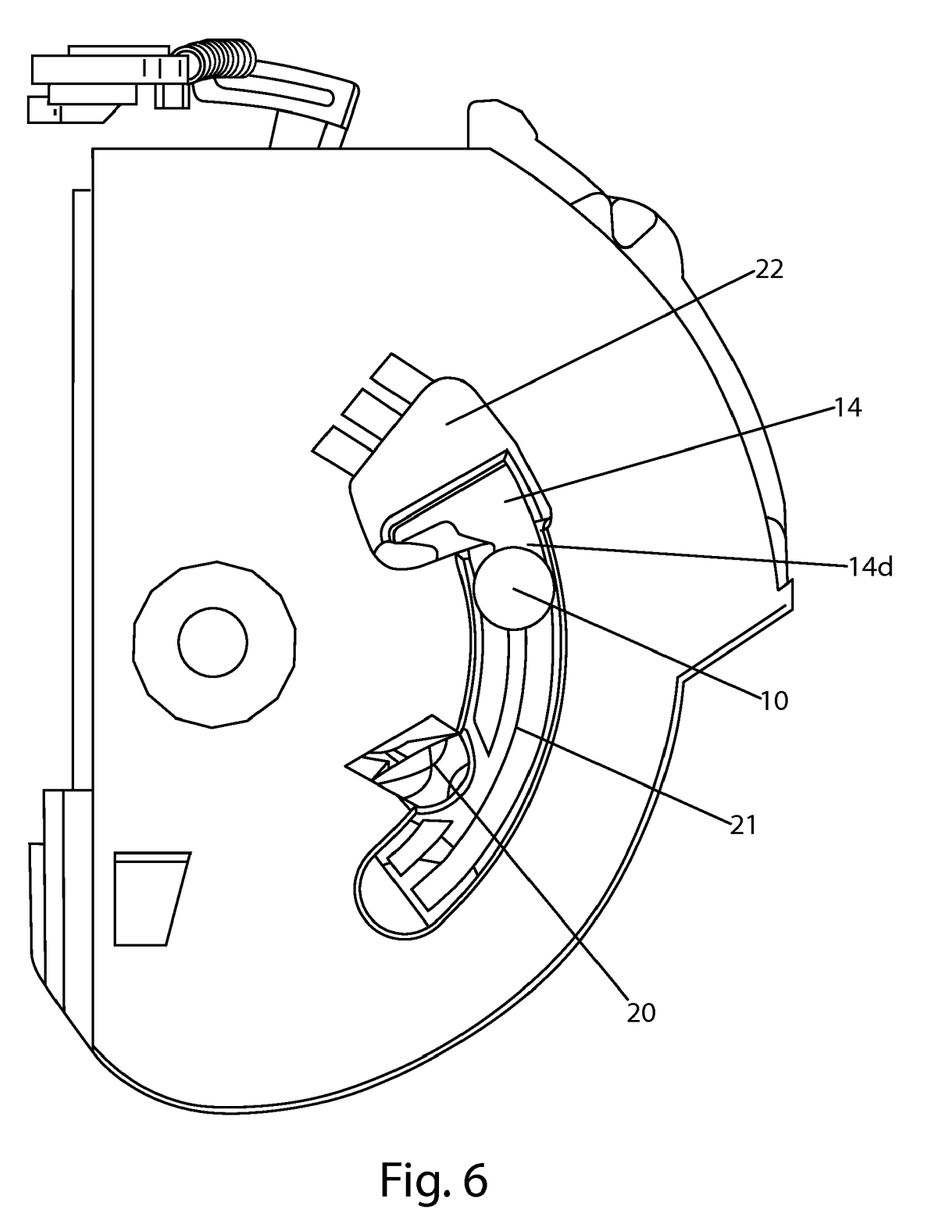
FIG. 6 is a further side view showing a movement of the ball of the immobilizer.

FIG. 6 shows the ball 10 as it is being transported along the channel 21 by the driver 2a, which is not illustrated, for clarity reasons. The depth of the channel 21 is only sufficient to allow the ball 10 to still project out of the channel 21 and thus to be gripped by the driver 2a on the roller 2. The channel runs concentrically with respect to the rotation point of the wheel 2.

The driver 2a makes contact with the ball 10 only when the ball 10 is located in the channel 21, and if this is not the case, the driver 2a does not make contact with any other element of the immobilizer during rotation of the wheel 2.

For its part, the ball 10 strikes an edge 14d of the rocker 14 and thus transmits the force originating from the moved wheel 2 to the rocker 14.

This means that a sufficiently large force is available to move the rocker 14.

As already described with reference to FIG. 3, the movement of the rocker 14 also results in a movement of the lever 18, and this lever 18 releases the magnetic body 6 from the permanent magnet 13. The initiation unit 3 can then assume the initial position in which, inter alia, the block 7 prevents the ball 10 from rolling along the groove 19 into the channel 20.

The ball 10 is now moved even further in the channel 21 by the driver 2a on the wheel 2, until the ball has reached an aperture 22, and can leave the channel 21 again through this aperture.

The ball is now located in the initial position, in the same way as the block 7.

When the initiation unit 3 is activated again, the same procedure starts again, with the only difference being that the movement of the rocker 14 results in the holding element 17 described in FIG. 2 assuming a position in which the rocker is released again.

In addition, the catch 15 now no longer engages in the tooth system 16. The wheel can once again be steered freely about the shaft L.

Figure 7:
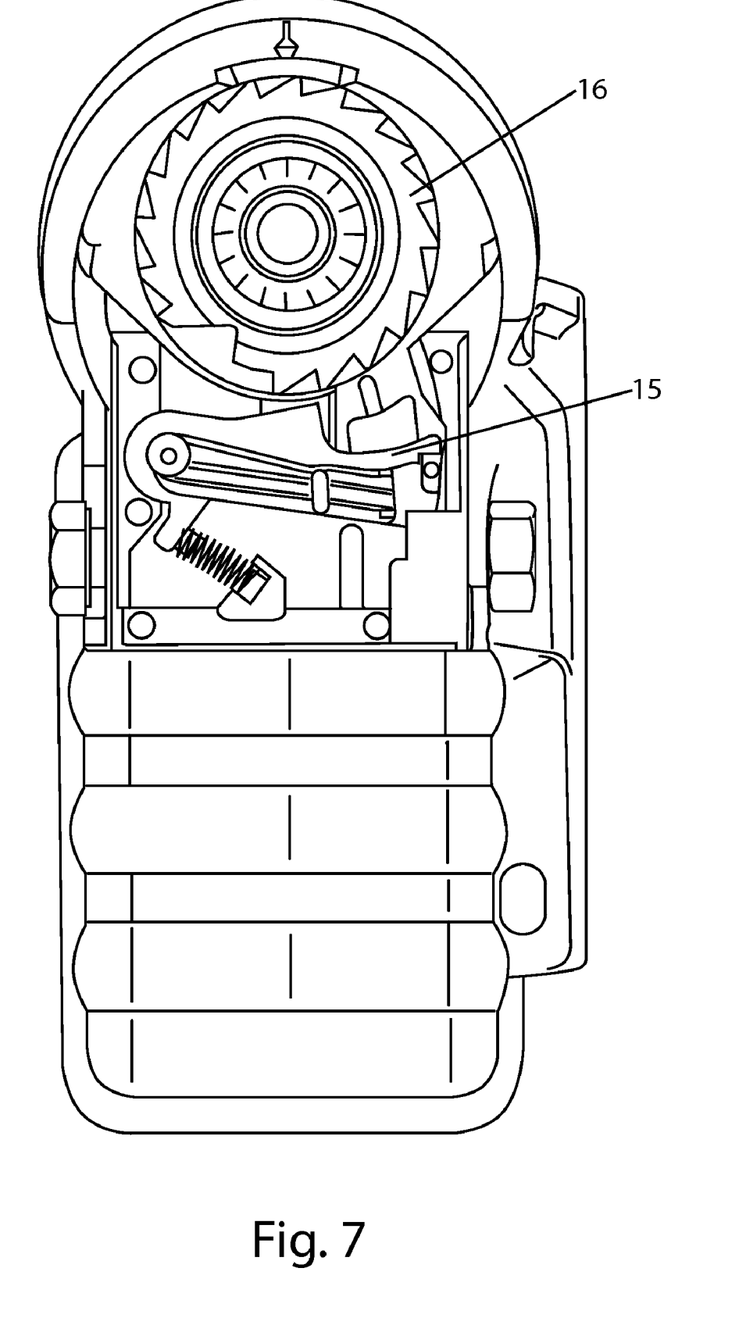
FIG. 7 is a top view of the immobilizer.

FIG. 7 shows the immobilizer known from FIG. 1 from above. This view clearly shows the catch 15 and the tooth system 16.

Figure 8:
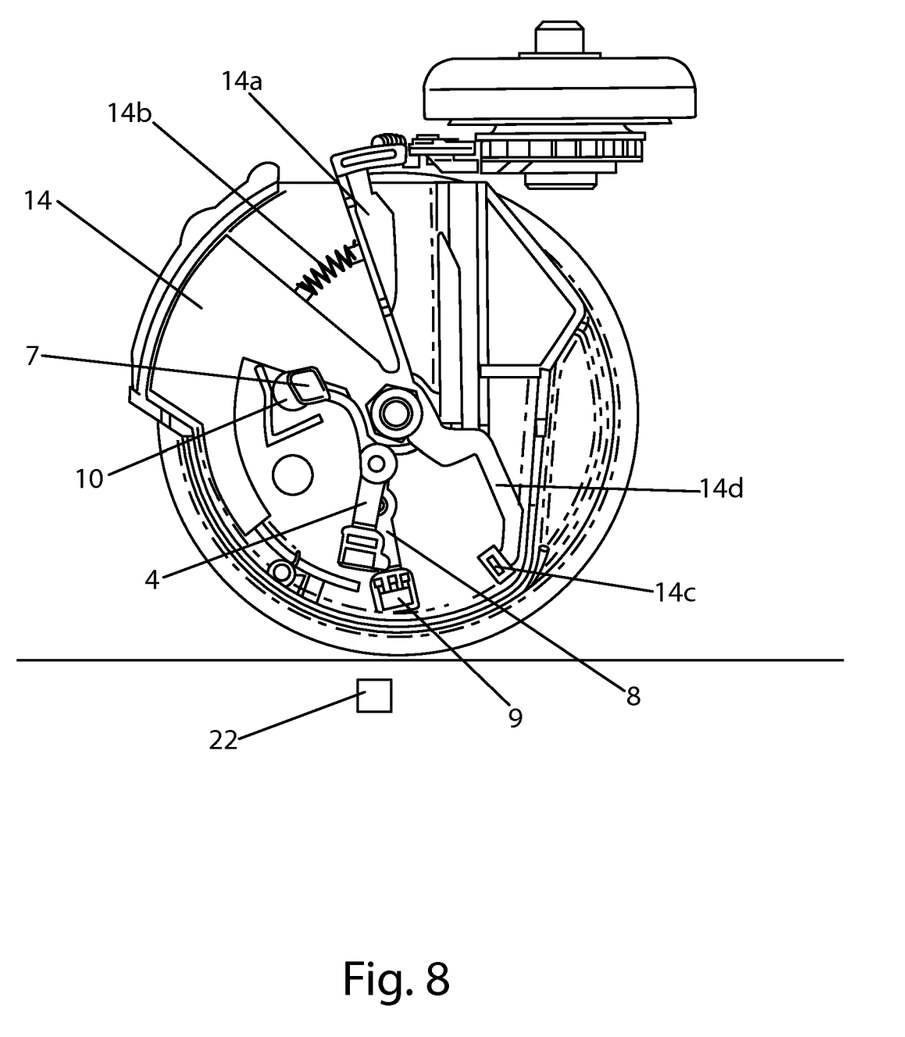
FIGS. 8-10 are side views of another embodiment of the immobilizer showing different positions the initiation unit.

FIG. 8 shows a development of the invention. The immobilizer is in the deactivated state and has just entered the area of influence of the magnet 22. A lever 14b, to whose end a magnet 14c is attached, is located on the rocker 14.

The magnet 22 has a weaker magnetic field than the magnet 11 known from FIG. 2. The force of the weaker magnet 22 produces only a minor effect on the magnet 9 and, in consequence, only a slight deflection of the levers 4 and 8, and the block 7 therefore does not release the ball 10.

The magnet 14c is moved sufficiently far away from the magnet 9 that no forces occur which result in stronger pivoting of the levers 4 and 8.

When the immobilizer passes the magnet 22, the state of the immobilizer does not change.

Figure 9:
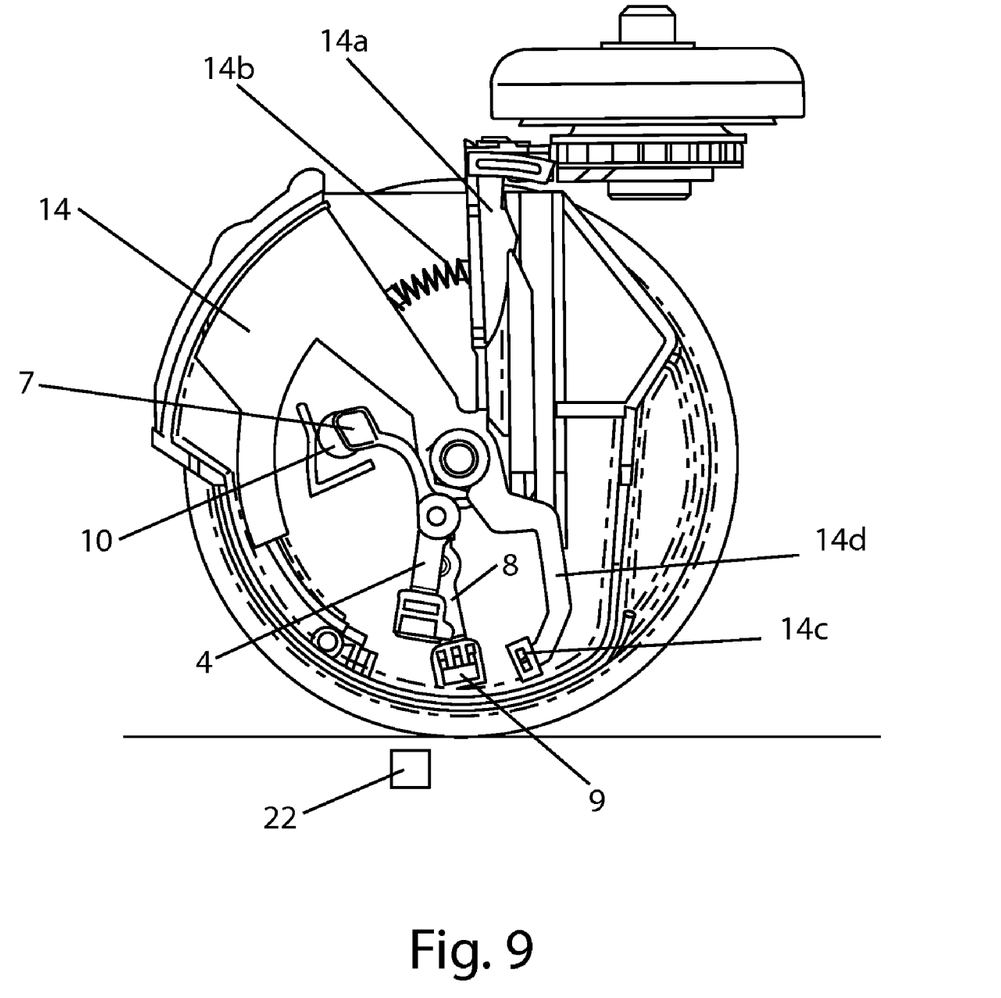
Figure 10:
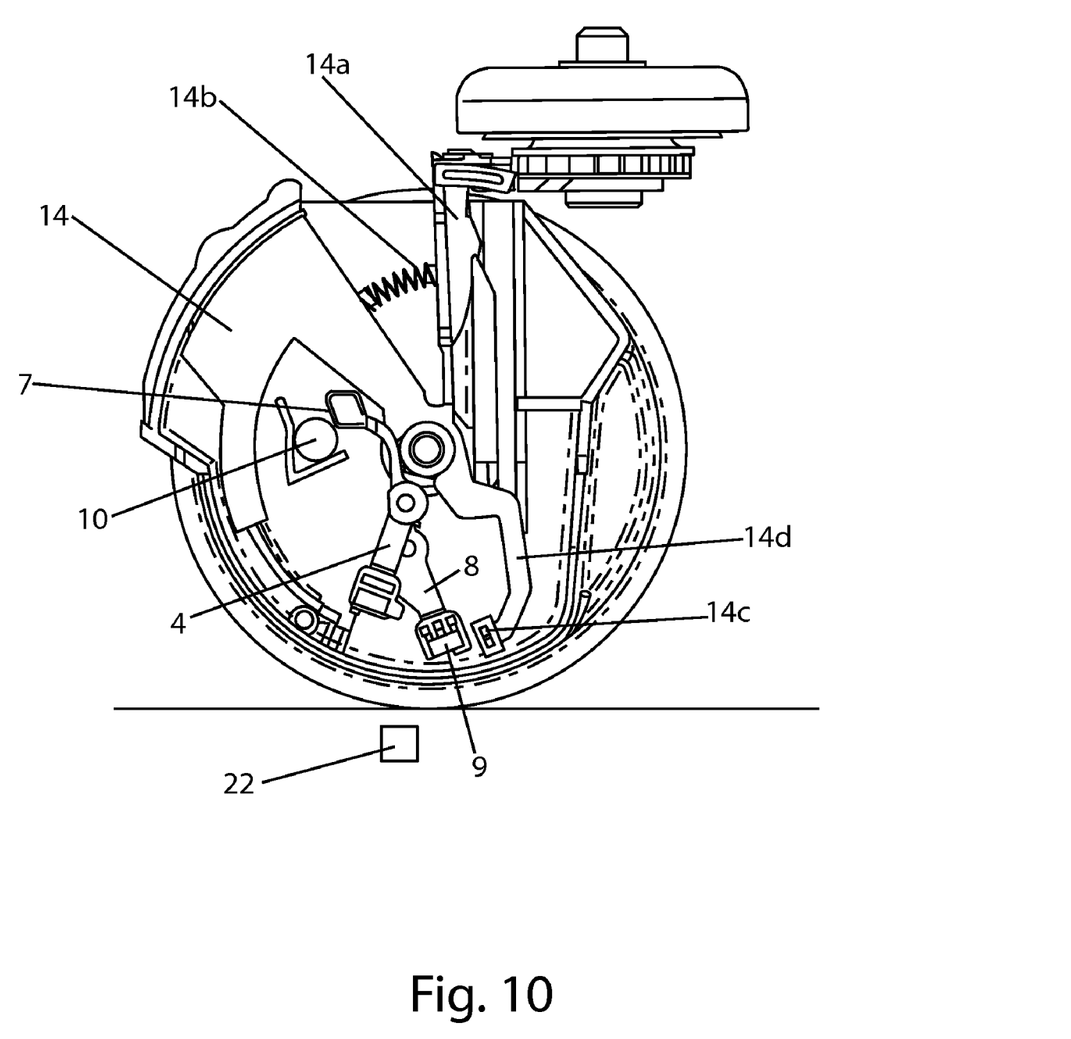

FIGS. 9 and 10 show the development of the immobilizer known from FIG. 4, in the activated state.

When the immobilizer is in the activated state, the magnet 14c is located at a different position within the immobilizer.

The magnet 22 once again produces only a slight deflection of the levers 4 and 8 (FIG. 9), although the magnet 14c is sufficiently close to the magnet 9 that the magnet 9 is moved further, resulting in the final position shown in FIG. 10.

This results in the levers 4 and 8 being deflected sufficiently greatly that the block 7 releases the ball 10 (FIG. 10).

The characteristic of the immobilizer according to the invention of being able to selectively react to a relatively weak magnetic field with deactivation can be advantageously used in various ways.

For example, it is possible to fit magnetic zones of low intensity within the permissible area, which deactivate an immobilizer which is still activated, when they are moved over.

A low-intensity magnetic zone such as this can, for example, advantageously be arranged in the area of the collection points for shopping trolleys, in order to ensure that all of the shopping trolleys which are removed from the collection point pass this zone and that any immobilizer which is still activated is therefore deactivated.

When a weakly magnetic zone such as this is located within the permissible area but relatively close to the zone with a strong magnetic field, which marks the boundary to the impermissible area, then this weak zone can be used to more reliably deactivate the immobilizers of those transport trolleys which are being moved back into the permissible area from the impermissible area:

In principle, all of the activated immobilizers are deactivated by the strongly magnetic zone. If, however, after passing the strongly magnetic zone, one of the immobilizers has for any reason whatsoever not yet been deactivated, then it is deactivated on moving over the weakly magnetic zone.

Since an activated immobilizer can be deactivated by a relatively weak magnetic field, the immobilizer is often also deactivated when a shopping trolley which has been raised on one side and has been moved back from the outside passes the boundary to the permissible area, and therefore the zone with the strong magnetic field.

The invention is industrially applicable wherever the aim is to prevent shopping trolleys or other transport trolleys from leaving a permissible area.

The invention claimed is:

1. An immobilizer for immobilizing a wheel, the immobilizer comprising:
    an initiation unit movable by magnetic forces acting on said initiation unit, the immobilizer for being activated by the movement of the initiation unit, the initiation unit having first means which compensate for the effects of disturbance forces acting on a part of the initiation unit and thus prevent significant movement of the initiation unit, and the initiation unit having second means for causing the initiation unit to be moved to an initiating position by magnetically caused forces, the first means having a lever mounted for rotation about a shaft, the lever having two lever arms, and one of the lever arms having a weight, the first means having a single-armed lever mounted for rotation about a further shaft, a rotational axis of the shaft and a rotational axis of the further shaft being parallel to an axis of the wheel, the single-armed lever having a permanent magnet attached thereto, the lever and the single-armed lever having an operative connection existing between one another such that forces which act on the lever and the single-armed lever compensate for one another and do not produce any significant movement of the initiation unit, and a magnetic force acting solely on the single-armed lever causes the initiation unit to be moved to the initiating position.

2. The immobilizer as claimed in claim 1, wherein the initiation unit has a body composed of a material which interacts with a magnet.

3. The immobilizer as claimed in claim 2, wherein the initiation unit remains fixed in the initiating position, since a force-fitting or interlocking holding element fixes the lever arm.

4. The immobilizer as claimed in claim 3, wherein the holding element is a further permanent magnet which is disposed to be stationary in the immobilizer and fixes the body by magnetic forces.

5. The immobilizer as claimed in claim 1, wherein the initiation element remains fixed in the initiating position even after the force responsible for the movement of the initiation unit to the initiating position is no longer acting.

6. The immobilizer as claimed in claim 1, wherein means are provided which end a fixed state of the initiating position of the initiation unit as soon as further components of the immobilizer have assumed a defined state.

7. The immobilizer as claimed in claim 6, wherein a positively controlled mechanism ends the fixed state of the initiation unit.

8. The immobilizer as claimed claim 1, wherein magnetic forces deactivate the immobilizer.

9. The immobilizer as claimed in claim 8, wherein magnetic forces weaker than the magnetic forces required to activate the immobilizer deactivate the immobilizer.

10. The immobilizer as claimed in claim 9, wherein the immobilizer contains a magnet which, when the immobilizer is activated, assumes a position in which the magnetic field of the magnet acts on the permanent magnet and assists the magnetic field acting from the outside such that the initiation unit assumes the initiation position.

11. The immobilizer as claimed in claim 1, wherein magnetic forces which correspond to magnetic forces which activate the immobilizer deactivate the immobilizer.

12. An immobilizer for immobilizing a wheel, the immobilizer comprising:
    an initiation unit movable by magnetic forces acting on said initiation unit, the immobilizer for being activated by the movement of the initiation unit, the initiation unit having first means which compensate for the effects of disturbance forces acting on a part of the initiation unit and thus prevent significant movement of the initiation unit, and the initiation unit having second means for causing the initiation unit to be moved to an initiating position by magnetically caused forces, the first means having a lever mounted for rotation about a shaft, the first means having a single-armed lever mounted for rotation about a further shaft, a rotational axis of the shaft and a rotational axis of the further shaft being parallel to an axis of the wheel, the single-armed lever having a permanent magnet attached thereto, the lever and the single-armed lever having an operative connection existing between one another such that forces which act on the lever and the single-armed lever compensate for one another and do not produce any significant movement of the initiation unit, and a magnetic force acting solely on the single-armed lever causes the initiation unit to be moved to the initiating position.

* * * * *